United States Patent [19]

Leis et al.

[11] Patent Number: 5,128,809
[45] Date of Patent: Jul. 7, 1992

[54] COHERENT MULTI-FREQUENCY SYNTHESIS

[75] Inventors: Michael D. Leis, Framingham, Mass.; Robert Y. Noguchi, Colorado Springs, Colo.; Joseph M. Rinaldis, Colorado Springs, Colo.; Robert A. Rubke, Colorado Springs, Colo.

[73] Assignee: Digital Equipment Corporation, Maynard, Mass.

[21] Appl. No.: 373,339

[22] Filed: Jun. 29, 1989

[51] Int. Cl.[5] .............................................. G11B 5/09
[52] U.S. Cl. ................................ 360/51; 360/42; 360/43; 360/49; 360/53
[58] Field of Search ...................... 360/51, 49, 48, 32, 360/40, 43, 42, 44, 53

[56] References Cited

U.S. PATENT DOCUMENTS

| | | | |
|---|---|---|---|
| 4,688,205 | 8/1987 | Abiko | 360/51 |
| 4,714,967 | 12/1987 | Bizjak | 360/48 |
| 4,894,734 | 1/1990 | Fischer et al. | 360/51 |

Primary Examiner—David J. Severin
Assistant Examiner—Varsha V. Sheladia
Attorney, Agent, or Firm—Arnold, White & Durkee

[57] ABSTRACT

Methods and circuitry for generating sector and data cell timing frequencies for banded variable frequency sector disc drive systems with dedicated plus embedded servo positioning systems which have the timing signals synchronized to servo track information written on a dedicated surface of the disc.

6 Claims, 2 Drawing Sheets

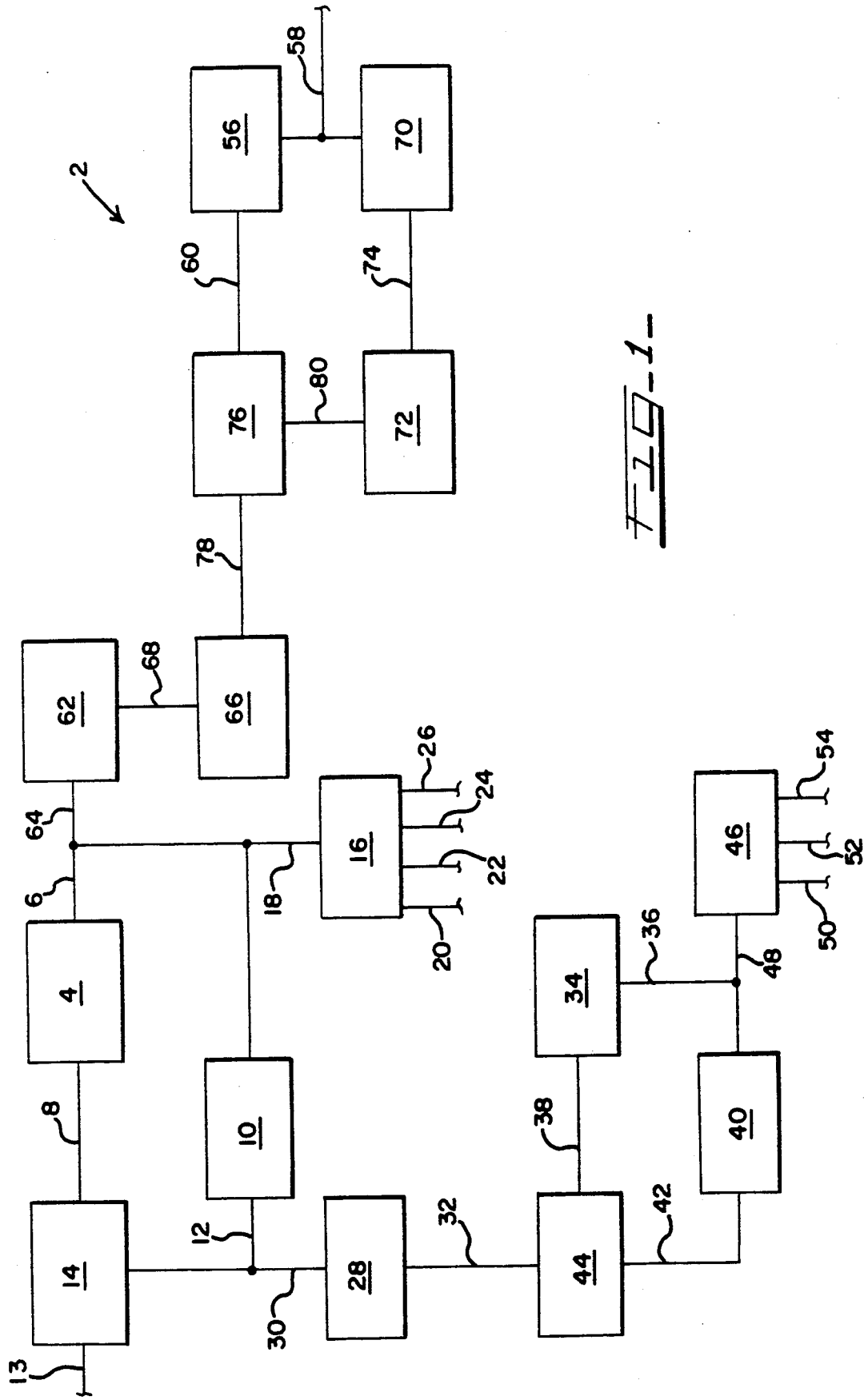

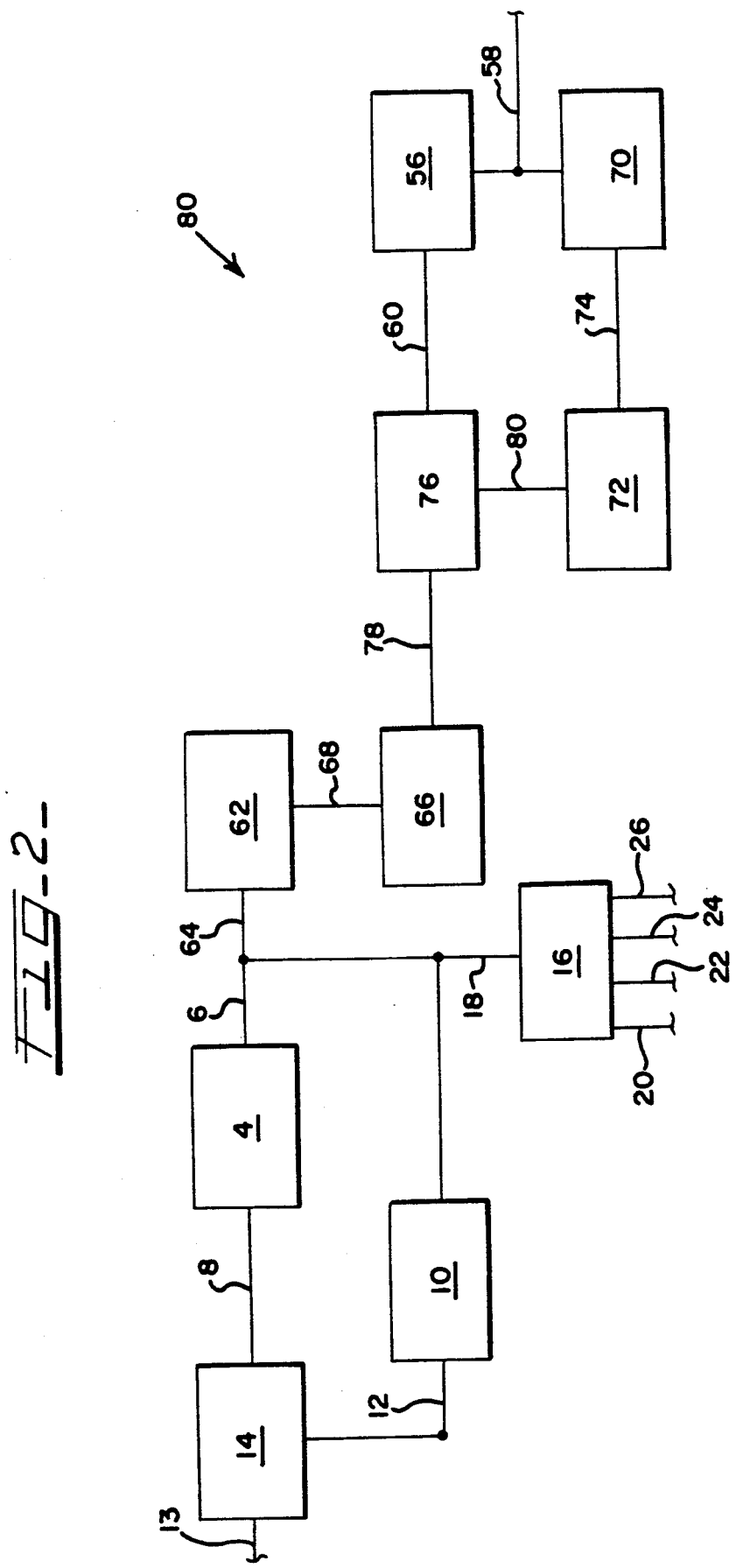

COHERENT MULTI-FREQUENCY SYNTHESIS

FIELD OF THE INVENTION

The present invention relates to methods and circuitry for generating a plurality of different frequency signals which are phase related and synchronized with each other, and more particularly to methods and circuitry for automatically generating a plurality of phase related and synchronized write clock signal frequencies for writing variable frequency data on track sectors of a data storage disc driven at a constant angular velocity.

BACKGROUND OF THE INVENTION

Data storage disc systems are widely used because of the rapid data storage and acquisition times possible with such systems. For reasons of economy and simplicity, such systems generally have disc drives which spin their data storage discs at a constant angular velocity. If the disc drive write clock has a single fixed frequency to provide a single fixed writing speed, the maximum possible data storage density is established on the smallest radius data track, since the larger radii data tracks have a greater track circumference with an identical angular velocity. Thus, recording density with a constant writing speed is less than optimum for such systems, particularly if the ratio of smallest to largest data track radii is large.

Since it is generally not feasible to operate disc drives in a constant linear track velocity mode, it is desirable to vary the write clock frequency to alter the data writing speed, so that writing speeds increase with increasing data track radius. Such variable frequency writing systems can often approach the optimum possible data storage density for a given disc and signal transducer combination.

However, it is not feasible to use a constantly variable frequency writing system having a frequency which is proportional to radius because of the necessity for supplying an integral number of data track sectors and servo frames if consistent sector lengths are to be maintained. Some disc drive systems include write clocks which change frequency only for groups of tracks, or bands, to provide an integral number of track sectors and servo frames for each band. In this way, a minimum selected number of sectors with a selected number of servo frames per sector for each sector is established for the innermost band with the smallest radii data tracks. The sector frequency and write clock frequency is increased for more outwardly bands with increased data track radii which can accommodate a larger integral number of sectors.

It is advantageous for disc drive systems to use one side of a disc specifically for positioning and tracking information, while using the other side and other discs for data storage tracks. The side of the disc used for positioning and tracking information is called the "dedicated" surface, and it has a series of servo tracks written on it which correspond in number and radii to the data tracks written on the discs. The servo tracks include accurate circumferential and radial positioning information, typically with twenty to thirty thousand position samples per revolution. This provides exceptionally high seek and timing performance, since a special servo head is mechanically coupled to the read/write heads which track the corresponding data tracks on the discs.

It is also advantageous for such disc drive systems to have tracking information embedded in "half-tracks" between the servo tracks of the dedicated surface. This embedded tracking information is typically in the form of alternating high frequency bursts on each side of each servo track, to provide an accurate off-center tracking indication which may be used for tracking error correction. Typically, one such bursts sample is embedded on each side of each servo track for each track sector.

The accurate position information recorded on the servo tracks of such discs with a dedicated surface is ideal for write clock frequency generation, since the ratio of the frequency of the position information to the disc rotational frequency is constant. This relationship is constant from track to track, regardless of radius. The multiple frequency write clock systems used to provide fixed length, variable frequency sector recording to maximimize recording density as described above do not use such an embedded and dedicated servo configuration. This is because of the difficulty in generating the multiple frequencies required for the write clock that are at the same time all synchronized with the positioning and tracking information on the dedicated surface.

SUMMARY OF THE INVENTION

The present invention provides the methods and circuitry for generating the multiple frequency clock signals necessary for both sector and sector data cell timing with banded variable frequency sector disc drive systems that use a disc with a dedicated and embedded surface for tracking servo and position information. A first phase-locked loop (PLL) is used to synchronize the output of a first voltage-controlled oscillator (VCO) with the signal frequency of the positioning information on the dedicated surface servo tracks. The first VCO output signal has a frequency which is a selected multiple of the servo track signal frequency to which it is synchronized. The output of the first VCO is divided by four different selected constants to provide four different sector timing frequency signals for four corresponding bands on the disc. Each of these sector timing frequency signals may then be used to clock the beginning of each sector on the corresponding band of the disc for the read and the write process. In a seven band system, a second PLL is used for three additional bands, interleaved between the other four. This second PLL has a second VCO synchronized to a selected submultiple of the first VCO output frequency. The output of the second VCO is a selected multiple of the selected submultiple of the first VCO output frequency to which it is synchronized. The output of the second VCO is divided by three different selected constants to provide three different sector timing frequency signals for the three different corresponding interleaved bands on the disc. Sector data cell timing for the write clock is provided by a third PLL which synchronizes a third VCO to a selected submultiple of the first VCO output frequency. The third VCO output signal frequency is a selected multiple of the selected submultiple of the first VCO output frequency to which it is synchronized. The third VCO frequency provides the data cell timing for sectors of the bands of the disc. Thus, both sector and sector data cell timing are derived from and synchronized to the rotational position information signal frequency on the servo tracks written on the dedicated surface of the disc for all the bands of either a four or seven band disc.

DESCRIPTION OF THE DRAWINGS

FIG. 1 is a system block diagram of the preferred embodiment of the invention.

FIG. 2 is a system block diagram of an alternate embodiment of the invention.

DESCRIPTION OF THE PREFERRED EMBODIMENT

Referring to the drawings, wherein like characters designate like or corresponding parts through the views, FIG. 1 is a system block diagram of the preferred embodiment of the invention. A multi-frequency synthesizer system 2 has a first voltage-controlled oscillator (VCO) 4 with a first VCO reference signal or a sector frequency control loop signal output on an output line 6. The VCO 4 has the frequency of its output signal controlled by the potential of an input signal fed to an input of the VCO 4 on an input line 8. The first VCO output signal on the line 6 is fed to the input of a first PLL frequency divider 10. The first PLL frequency divider 10 divides the frequency of the first VCO signal by a first PLL loop division factor to produce a first PLL feedback signal from its output on a line 12.

The digitized read signal retrieved from the tracks on the dedicated surface of the disc is applied on a line 13 as the first input of a first phase detector 14. The first PLL feedback signal from the first PLL frequency divider 10 on the line 12 is fed to a second input of the first phase detector 14. The first phase detector 14 produces a phase error signal from its output on the line 8, which error signal serves as the input signal for the first VCO 4. If the data rate of the data after encoding is represented as F, the first VCO 4 should produce an output signal that has a frequency which corresponds to twice the data rate of the data after encoding, or 2F, which is twice the data cell rate. If the signal retrieved from the disc is encoded according to the 1, 7 code, the VCO 4 should have an output frequency which is three times the unencoded data frequency. In this case the first PLL loop division factor of the PLL loop frequency divider 10 is selected to be 3(8). With this division factor, the frequency of the output signal of the first VCO 4 is synchronized with the data cell frequency of the encoded signal retrieved from the tracks on the dedicated surface of the disc at a frequency which is three times the data rate of the data before encoding, 2F. The 2F frequency so maintained corresponds to twice the cell rate of the data after encoding relative to the reference band on the servo tracks written on the dedicated side of the disc, which is a constant for all of the tracks.

The output signal of the first VCO 4 on the line 6 is also fed into an input of a quadruple output frequency divider 16 via a line 18. Of course, the quadruple output frequency divider 16 may simply be four individual frequency dividers with their inputs coupled together. The quadruple output frequency divider 16 has four different division factors, represented as $A_0$, $A_1$, $A_2$ and $A_3$, producing four different frequency signals from four different outputs of the divider 16 on lines 20, 22, 24 and 26, respectively. The signal on the line 20 has a frequency which corresponds to $2F/A_0$. If $A_0$ is the highest division factor of the division factors $A_0$, $A_1$, $A_2$ and $A_3$, the signal on the line 20 corresponds to the sector frequency of the "innermost" band of the disc which has the group of smallest radii tracks on the data storage surface, represented as "band 0". The division factor $A_1$ has a lower value than the division factor $A_0$, so that the signal on the line 22 has a frequency $2F/A_1$ which corresponds to the sector frequency of a band more outwardly positioned than band 0, represented as "band 1". The division factor $A_2$ has a lower value than the division factor $A_1$, so that the signal on the line 24 has a frequency $2F/A_2$ which corresponds to the sector frequency of a band more outwardly positioned than band 1, represented as "band 2". The division factor $A_3$ has a lower value than the division factor $A_2$, so that the signal on the line 26 has a frequency $2F/A_3$ which corresponds to the sector frequency of the outwardmost band, represented as "band 3".

The choice of the division factors $A_0$, $A_1$, $A_2$ and $A_3$ depend upon several factors, such as the reference frequency 2F and the number of sectors-per-track. The band boundaries and the number of sectors-per-track are determined by the maximum bit density in bits-per-inch (bpi) of track allowed by the magnetic properties of the disc drive read/write head and disc combination. The number of sectors for the innermost band is determined by the lowest band constant times the multiplier. The band constant is an integer number, and it is different for each of the four bands. The band multiplier is a constant for each of the bands, and it is an even numbered integer number for the preferred embodiment of seven bands.

The number of sectors for the innermost band is chosen to secure the best compromise between maximum bpi and the physical limitations of the read/write head. The band multiplier is then chosen to maximize the storage capacity of the disc. Of course, the band boundary radii of the different bands will vary with the selection of the band multiplier. The best combination of band multiplier and band constants places the most tracks in the outer band. The selection of the best combination is within the ability of one ordinarily skilled in this field. In this way, the outer band has the most sectors, so the disc capacity increases more rapidly as the outer band expands, and more data is transferred per disc revolution. Also, the outermost band has the highest track velocity, so the transfer rate is the fastest per sector. The number of bytes-per-sector is a matter of design choice within the ability of one ordinarily skilled in this field which allows for system requirements for the sector overhead. The sector overhead includes data such as servo bursts, block address and error correction information.

The number of frames-per-servo track on the dedicated surface of the disc is determined from the band which has a band constant with the largest prime number. The relationship may be expressed as $$\frac{\text{Number of Frames}}{\text{per track}} = \frac{(\text{sectors/track})(\text{bytes/sector})}{(\text{bytes/frame})}$$

wherein the value of sectors-per-track is that of the band having the largest prime number band constant value, and the number of bytes-per-sector and the number of bytes per frame are selected as described above. The reference frequency 2F is then determined from the band containing the band constant with the largest prime number integer according to the following relationship:

$$2F = (\text{sectors/track})(\text{bytes/sector})(\text{rev/second})$$
$$(3)(8)$$

The value of sectors-per-track and bytes-per-sector is the same as the relationship for the number of frames-per-servo track. Revolutions per second is that of the disc. The division factor $A_0$ through $A_3$ are determined from the relationship $$A_n = \frac{2F}{(\text{sectors/band})(\text{rev/second})}$$

where n=0, 1, 2 or 3. The sectors-per-band value in the above equation is the number of sectors in the band for the corresponding division factor.

The sector frequencies for four out of the seven bands of the preferred embodiment are provided by the quadruple output frequency divider 16 on its output lines 20, 22, 24 and 26. The sector frequencies for the other three interleaved bands are derived from a second PLL. The output of the first PLL frequency divider 10 on the line 12 is fed to an input of a second PLL frequency prescaler 28 via a line 30. The prescaler 28 produces a prescaler output signal on an output line 32 which is a selected fraction of the output of the first PLL frequency divider 10. The prescaler division factor may be represented by the expression I/J, where I is the number of bytes per sector divided by one of the selected values 12, 20 or 60, depending on the band constants. J is an integer equal to or greater than 1. A second VCO 34 has an output signal $F_0$ on an output line 36. The output signal of the second VCO 34 on the line 36 is controlled in frequency by the potential of an input signal fed to an input on the VCO 34 via a line 38. The second VCO output on the line 36 is fed to an input of a second PLL frequency divider 40. The second PLL frequency divider 40 divides the frequency of the second VCO output signal by a second PLL loop division factor to produce a second PLL feedback signal from its output on a line 42.

The output of the prescaler 28 on the line 32 is fed into a first input of a second phase detector 44. The second PLL feedback signal on the line 42 is fed to a second input of the second phase detector 44. The second phase detector 44 produces a phase error signal from its output on the line 38, which error signal serves as the input signal for the second VCO 34. The output of the second VCO 34 on the line 36 is fed to an input of a triple output frequency divider 46 via a line 48. Of course, the triple output frequency divider 46 may simply be three individual frequency dividers with their inputs coupled together. The triple output frequency divider 46 has three different division factors, represented as $B_0$, $B_1$ and $B_2$, producing three different frequency signals from three different outputs of the divider 46 on lines 50, 52 and 54, respectively. The signal on the line 50 has a frequency which corresponds to $F_0/B_0$. If $B_0$ is the highest division factor of the division factors $B_0$, $B_1$ and $B_2$, the signal on the line 50 corresponds to the sector frequency of a band, represented as "band 0.5," which is interleaved between the innermost band 0 and the more outwardly positioned band 1. The division factor $B_1$ has a lower value than the division factor $B_0$, so that the signal on the line 52 has a frequency $F_0/B_1$, which corresponds to the sector frequency of a band, represented as "band 1.5," which is interleaved between the band 1 and the band 2. The division factor $B_3$ has a lower value than the division factor $B_2$, so that the signal on the line 54 has a frequency $F_0/B_2$ which corresponds to the sector frequency of a band, represented as "band 2.5", which is interleaved between the band 2 and the band 3.

The above described signals on the lines 20 through 26 from the quadruple output frequency divider 16 and the lines 50 through 54 from the triple output divider 46 provide sector timing signals for a seven band disc with signal synchronization provided by the data cell timing frequency of the servo tracks written on the dedicated surface of the disc. Specific values of division factors suitable for the first and second PLL systems are discussed in detail below.

Data cell timing for the disc drive write clock is provided by a third PLL system. A third VCO 56 has a third VCO output signal with a third VCO output frequency $2F_w$ on a line 58. The frequency $2F_w$ of the signal output of the third VCO 56 on the line 58 is twice the frequency $F_w$ of the data cell rate for the selected band. The third VCO 56 has the frequency of its output signal on the line 58 controlled by the potential of an input signal on a line 60. The output of the first VCO 4 on the line 6 is fed to an input of a third PLL input frequency divider 62 via a line 64. The divider 62 has a division factor represented by $2P_L$, wherein $P_L$ is the band constant with the largest prime number value. The output of the divider 62 is fed to the input of a first code dependent scaler 66 via a line 68. The first code dependent scaler 66 has a division factor "a" which is selected according to the disc drive data encoding system used. For instance, a=1 for the 1-7-2-3 code, and a=3 for the 2-7-1-2 code. The output of the third VCO 56 on the line 58 is fed to an input of a programmable frequency divider 70. The programmable frequency divider 70 has a programmable division factor which is dependent upon the sector frequency of the selected band, as explained in more detail below. The output of the programmable divider 70 is fed to an input of a second code dependent scaler 72 on a line 74. The second code dependent scaler 72 has a division factor b which is selected according to the disc drive data encoding system used. For instance, b=1 for the 1-7-2-3 code, and b=4 for the 2-7-1-2 code.

The output of the first code dependent scaler 66 is fed to a first input of a third phase detector 76 on a line 78. The output of the second code dependent scaler 72 is fed to a second input of the third phase detector on a line 80. The third phase detector 76 produces an output signal proportional to the difference in phase between the output of the first code dependent scaler 66 on the line 78 and the output of the second code dependent scaler 72 on the line 80, which output signal serves as the input signal on the line 60 to control the frequency of the third VCO 56 output signal on the line 58.

Table 1 indicates four selected groups of variables for use in the system 2 which provide satisfactory performance with the above-described seven band system. All four groups are listed with a frame length of four bytes, a constant bytes-per-sector multiplication factor represented by X, and a band constant multiplication factor represented by M. When the indicated values of bytes-per-sector are multiplied by the bytes-per-sector-multiplication factor X, the result represents the respective number of bytes-per-sector for the tracks of the disc. Likewise, when the indicated band constants are multiplied by the band constant multiplier M the result represents the respective number of sectors for each band. M must be an even numbered integer for this embodiment.

TABLE 1

|  | Case 1 | Case 2 | Case 3 | Case 4 |
|---|---|---|---|---|
| m = OD/ID ratio | 1.88 < m < 2.13 | 1.7 < m < 1.9 | 1.58 < m < 1.75 | 1.5 < m < 1.64 |
| Bytes per sector | 4(5)X | 4(5)X | 4(3)X | 4(3)5(X) |
| Band constant 7 bands | 4,5,6,7 | 5,6,7,8 | 6,7,8,9 | 7,8,9,10 |
| No. of sectors per band | M(4,9/2,5, 11/2,6,13/2, 7) | M(5,11/2 6,13/2, 7,15/2,8) | M(6,13/2 7,15/2, 8,17/2,9) | M(7,15/2 8,17/2,9, 19/2,10) |

For instance, with the selected group of variables listed under "Case 3" in Table 1, if the bytes-per-sector multiplication factor X is 31, there is a total of 744 bytes-per-sector. The band constant multiplier M is 14, and the angular velocity of the disc $W_d$ is 60 revolutions-per-second, the input signal to the first phase detector 14 on the line 13 has a frequency F, which is:

$$F_1 = (\text{bytes/sector}) \, M \, (P_L) \, W_d$$

Since the frequency $F_1$ of the input signal on the line 13 is compared to the frequency of the output of the first PLL frequency divider 10 on the line 12, the first VCO output signal on the line 6 has a frequency 2F which is $F_1(3)8$, or:

$$2F = (744) \, 14 \, (7) \, 60 \, (3) \, 8 = 104.99328 \text{ Mhz}$$

The division factors $A_0$ through $A_3$ for the quadruple output frequency divider 16 are then:

$$A_0 = \frac{2F}{W_d(M) \, 6} = \frac{104.99328(10^6)}{60(14)6} = 20,832$$

$$A_1 = \frac{2F}{W_d(M) \, 7} = \frac{104.99328(10^6)}{60(14)7} = 17,856$$

$$A_2 = \frac{2F}{W_d(M) \, 8} = \frac{104.99328(10^6)}{60(14)8} = 15,624$$

$$A_3 = \frac{2F}{W_d(M) \, 9} = \frac{104.99328(10^6)}{60(14)9} = 13,888$$

Therefore, the frequency of the output signal on the line 20 of the quadruple output frequency divider 16 for sector timing on the band 0 is $2F/A_0 = 5040$ hz. The frequency of the output signal on the line 22 for sector timing on the band 1 is $2F/A_1 = 5880$ hz. The frequency of the output signal on the line 24 for sector timing on the band 2 is $2F/A_2 = 6720$ hz. The frequency of the output signal on the line 26 for sector timing on the band 3 is $2F/A_3 = 7560$ hz. The sector frequencies for these bands are shown in Table 2.

TABLE 2

| Band | Sector Frequency | Write Clock Frequency |
|---|---|---|
| 0 | 5040 hz | 89.99424 Mhz |
| 0.5 | 5460 hz | 97.49376 Mhz |
| 1 | 5880 hz | 104.99328 Mhz |
| 1.5 | 6300 hz | 112.4928 Mhz |
| 2 | 6720 hz | 119.99232 Mhz |
| 2.5 | 7140 hz | 127.49184 Mhz |
| 3 | 7560 hz | 134.99136 Mhz |

The frequencies of the signal generated by the second PLL frequency divider 46 provide sector timing for the interleaved bands 0.5, 1.5 and 2.5. If the prescaler 28 division factor I/J has a value for I of 744/12 = 62, and a value for J of 1, the output signal of the prescaler 28 on the line 32 has a frequency $F_2$ which is:

$$F_2 = (\text{bytes/sector}) \, M \, (P_L)(J/I)(W_d)$$
$$= 744 \, (14) \, 7 \, (1/62) \, (60) = 70.56 \text{ khz}$$

It is important that the output signal of the second VCO 34 on the line 36 have a frequency, represented by $F_0$, which is divisible by the triple output frequency divider 46 to produce signals with frequencies intermediate to those produced by the quadruple output frequency divider 16. Since the band constants 6, 7, 8 and 9 are used for the bands 0, 1, 2 and 3, respectively, the band constants used for the bands 0.5, 1.5 and 2.5 are midway between the band constants for the bands 0, 1, 2 and 3. Actually, the band constants for the second PLL are midway between twice the value of the band constants for the first PLL. The band multiplier for the second PLL is only half of that for the first PLL. Consequently, the band multiplier for the second PLL is $M/2 = 7$, and the band constant for the band 0.5 is $$\frac{2(6) + 2(7)}{2} = 13$$

the band constant for the band 1.5 is $$\frac{2(7) + 2(8)}{2} = 15$$

and the band constant for the band 2.5 is $$\frac{2(8) + 2(9)}{2} = 17$$

To produce the proper frequency $F_0$ for these band constants, it is important that the second PLL division factor include the product of these band constants, or prime number values which evenly divide into these band constants which do not otherwise divide into the first PLL band constants. Thus, the division factor of the second PLL frequency divider 40 is 13(5)17. It is not 13(15)17, because 15 is divisible by the prime numbers 3 and 5, but 3 already divides into the first PLL band constants 6 and 9. Thus, the frequency $F_0$ of the second VCO output signal on the line 36 is:

$$F_0 = F_2 \, (13) \, 5 \, (17) = 77.9688 \text{ Mhz}$$

Using the second PLL band multiplier $M/2 = 7$ and the second PLL band constants 13, 15 and 17, the respective division factors $B_0$, $B_1$ and $B_2$ are:

$$B_o = \frac{F_o}{W_d(M/2)\ 13} = 14{,}280$$

$$B_1 = \frac{F_o}{W_d(M/2)\ 15} = 12{,}376$$

$$B_2 = \frac{F_o}{W_d(M/2)\ 17} = 10{,}920$$

Therefore, the frequency of the output signal on the line 50 of the triple output frequency divider 46 for sector timing on the band 0.5 is $F_0/B_0 = 5460$ hz. The frequency of the output signal on the line 52 for sector timing on the band 1.5 is $F_0/B_1 = 6300$ hz. The frequency of the output signal on the line 54 for sector timing on the band 2.5 is $F_0/B_2 = 7140$ hz. The output signals of the triple output frequency divider 46 in the second PLL have frequencies which fit squarely between the frequencies of the output signals generated by the quadruple output frequency divider 16 in the first PLL, as shown in Table 2.

The programmable division factor of the programmable frequency divider 70 is set to a selected value for each different selected band to provide timing for the desired number of data cells per sector on the selected band. The value of the programmable division factor depends on the data code selected, because the selected data code changes the values of the division factors for the first code dependent scaler 66 and the second code dependent scaler 72. For instance, if the 1-7-2-3 code is used, the signal fed to the first input of the third phase detector 76 on the line 78 has a frequency $F_3$ corresponding to the frequency 2F divided by both the division factors of the third PLL input frequency divider 62 and the first code dependent scaler 66. Since the division factor of the third PLL input frequency divider 62 is 2 $P_L = 14$, and the division factor of the first code scaler 66 is $a = 1$, the frequency $F_3$ of the signal on the line 78 is:

$$F_3 = \frac{2F}{2P_L(a)} = \frac{104.99328(10^6)}{14(1)} = 7.4952\ \text{Mhz}$$

Since the frequency $F_3$ of the input signal on the line 78 is compared to the frequency of the output of the second code scaler 72 on the line 80, the output signal $2F_w$ of the third VCO 56 on the line 58 is locked to a frequency corresponding to the frequency $F_3$ of the input signal on the line 78 divided by both the division factor of the second code dependent scaler 72 and the programmed division factor of the programmable frequency divider 70. The division factor of the second code scaler 72 is $b = 1$. The programmed division factors, represented as third PLL "band constants", are then selected to provide the desired write clock frequencies for each of the seven bands. For example, the third PLL band constants 12 through 18 for the seven bands 0 through 3 provide one possible group of write clock frequency values for the output signal of the third VCO 56 on the line 58. The write clock frequencies $2F_w$ for the seven bands 0 through 3 for respective third PLL band constants 12 through 18 are:

Band 0: $2F_w = F_3(b)12 = 89.99424$ Mhz
Band 0.5: $2F_w = F_3(b)13 = 97.49376$ Mhz
Band 1: $2F_w = F_3(b)14 = 104.99328$ Mhz
Band 1.5: $2F_w = F_3(b)15 = 112.4928$ Mhz
Band 2: $2F_w = F_3(b)16 = 119.99232$ Mhz
Band 2.5: $2F_w = F_3(b)17 = 127.49184$ Mhz
Band 3: $2F_w = F_3(b)18 = 134.99136$ Mhz the write clock frequencies $2F_w$ for the different bands are also listed in Table 2 along with their respective sector frequencies for each of the seven bands 0 through 3.

The above-described seven band configuration may be used with a wide variety of different sector and data cell frequencies, and with different system data codes, as will be appreciated by those skilled in the art. Furthermore, for many applications four bands provide a sufficient increase in storage density, so that only the first PLL alone is necessary to generate the sector frequencies for all four bands. In such instance, the second PLL is deleted and the programmable frequency divider 70 is only programmed to select four different third PLL band constants.

A simplified four band synthesizer system 80 is shown in FIG. 2. The system 80 includes the first VCO 4, the first PLL divider 10, the first phase detector 14, and the quadruple output frequency divider 16 to produce the sector frequencies for the bands 0, 1, 2 and 3 just as described above for the preferred embodiment. However, the band constant multiplier M for this system can be either even or odd, since no sector frequencies for additional interleaved bands need be generated with a second PLL. The system 80 also includes the third VCO 56, third PLL input frequency divider 62, the first code dependent scaler 66, the programmable divider 70, the second code dependent scaler 72 and the third phase detector 76 of the preferred embodiment described above, but the programmable divider 70 is only programmed for four different third PLL band constants to provide a synchronized write frequency signal for each of the selected bands 0, 1, 2 and 3.

Table 3 indicates four selected groups of variables for use in the above-described system 80 which provide satisfactory performance with the simple four band system. All four examples are listed with a frame length of four bytes, a constant bytes-per-sector multiplication factor represented by X, and a band constant multiplication factor represented by M, just as indicated for the preferred embodiment described above. However, for this embodiment, M may be either an even or an odd numbered integer.

TABLE 3

|  | Case 1 | Case 2 | Case 3 | Case 4 |
|---|---|---|---|---|
| m = OD/ID ratio | 1.88 < m < 2.13 | 1.7 < m < 1.9 | 1.58 < m < 1.75 | 1.5 < m < 1.64 |
| Bytes per sector | 4(5)X | 4(5)X | 4(3)X | 4(3)5(X) |
| Band constant | 4,5,6,7 | 5,6,7,8 | 6,7,8,9 | 7,8,9,10 |
| 4 bands No. of sectors | M(4,5,6,7) | M(5,6,7,8) | M(6,7,8,9) | M(7,8,9,10) |

TABLE 3-continued

| | Case 1 | Case 2 | Case 3 | Case 4 |
|---|---|---|---|---|
| per band | | | | |

For instance, with the selected group of variables listed under "Case 2" in Table 3, if the bytes-per-sector multiplication factor X is 37, producing a total of 740 bytes-per-sector, the band constant multiplier M is 9, and the angular velocity of the disc $w_d$ is 90 revolutions-per-second, the input signal to the first phase detector 14 on the line 13 has a frequency F, which is:

$$F_1 = \text{(bytes/sector)} M (P_L) W_d$$
$$= (740)9(7)90 = 4.1958 \text{ Mhz}$$

Since the frequency of the input signal on the line 13 is compared to the frequency of the output of the first PLL frequency divider 10 on the line 12, the first VCO output signal on the line 6 has a frequency 2F which is:

$$2F = F_1 (3)8 = 100.6992 \text{ Mhz}$$

The division factors $A_0$ through $A_3$ for the quadruple output frequency divider 16 are then:

$$A_o = \frac{2F}{W_d(M)5} = \frac{100.6992(10^6)}{90(9)5} = 24,864$$

$$A_1 = \frac{2F}{W_d(M)6} = \frac{100.6992(10^6)}{90(9)6} = 20,720$$

$$A_2 = \frac{2F}{W_d(M)7} = \frac{100.6992(10^6)}{90(9)7} = 17,760$$

$$A_3 = \frac{2F}{W_d(M)8} = \frac{100.6992(10^6)}{90(9)8} = 15,540$$

Therefore, the frequency of the output signal on the line 20 of the quadruple output frequency divider 16 for sector timing on the band 0 is $2F/A_0=4050$ hz. The frequency of the output signal on the line 22 for sector timing on the band 1 is $2F/A_1=4860$ hz. The frequency of the output signal on the line 26 for sector timing on the band 2 is $2F/A_2=5670$ hz. The frequency of the output signal on the line 26 for sector timing on the band 3 is $sF/A_3=6480$ hz. The sector frequencies for these bands are shown in Table 4.

TABLE 4

| Band | Sector Frequency | Write Clock Frequency |
|---|---|---|
| 0 | 4050 hz | 71.9280 Mhz |
| 1 | 4860 hz | 86.3136 Mhz |
| 2 | 5670 hz | 100.6992 Mhz |
| 3 | 6480 hz | 115.0848 Mhz |

Just as for the preferred embodiment described above, the programmable division factor of the programmable frequency divider 70 is set to a selected value for each different selected band to provide timing for the desired number of data cells per sector in the selected band. The value of these division factors also depend on the selected code as explained above. If the 1-7-2-3 code is used, a=1 and b=1. For this embodiment, the division factor of the third PLL input frequency divider 62 is $P_L$, instead of $2P_L$ for the preferred embodiment, since none of the frequencies corresponding to the interleaved bands 0.5, 1.5 and 2.5 used in the preferred embodiment need be generated. Consequently, the frequency $F_3$ of the signal on the line 78 is:

$$F_3 = \frac{2F}{P_L(a)} = 14.3856 \text{ Mhz}$$

Since the frequency $F_3$ of the input signal on the line 78 is compared to the frequency of the output of the second code scaler 72 on the line 80, the output signal $2F_w$ of the third VCO 56 on the line 58 is locked to a frequency corresponding to the frequency $F_3$ of the input signal on the line 78 divided by both the division factor of the second code dependent scaler 72 and the programmed band constants of the programmable frequency divider 70.

The write clock frequencies for the four bands 0 through 3 for respective third PLL band constants 5 through 8 are:
Band 0: $2F_w=F_3(b)5=71.9280$ Mhz
Band 1: $2F_w=F_3(b)6=86.3136$ Mhz
Band 2: $2F_w=F_3(b)7=100.6992$ Mhz
Band 3: $2F_w=F_3(b)8=115.0848$ Mhz
The write clock frequencies $2F_2$ for the different bands are also listed in Table 4 along with their respective sector frequencies for each of the four bands 0 through 3.

While the embodiments described above are explained for a seven band interleaved frequency system and a four band non-interleaved frequency system, the methodology and circuitry of the present invention is easily adapted by those skilled in the art to comprise a greater or lesser number of band frequencies with both the interleaved frequency system and the non-interleaved frequency system. Likewise, the methodology and circuitry of the present invention which only pertains to the sector timing frequencies may be used, according to design choice.

Thus there has been described herein methods and circuitry for generating sector and data cell timing frequencies for banded variable frequency sector disc drive systems which have the timing signals synchronized to servo track information written on a dedicated surface of the disc. It will be understood that various changes in the details, arrangements and configurations of the components and systems which have been described above in order to explain the nature of the invention may be made by those skilled in the art within the principle and scope of the invention as expressed in the appended claims.

What is claimed is:

1. A method of generating different frequency sector timing signals for a banded variable frequency sector disc drive system which are derived from and synchronized to timing frequencies of information signals on servo tracks written on a dedicated surface of an associated disc, comprising the steps of:
  selecting a plurality of different sector timing frequencies each corresponding to a different band on said disc, each of said plurality of different sector timing frequencies being proportional to the product of one of a plurality of integer band constants and a integer band constant multiplier;

generating a sector frequency control loop signal having a frequency which is an integral multiple of each of said plurality of sector timing frequencies;

receiving a reference signal from said servo tracks which has a frequency corresponding to the one of said sector timing frequencies having the one of said band constants with the largest prime number;

dividing said sector frequency control loop signal by an integer value to produce a sector frequency feedback signal having a frequency approximating said reference signal;

comparing the phase of said sector frequency feedback signal with said reference signal;

adjusting the frequency of said sector frequency control loop signal to synchronize the phase of said sector frequency control loop signal with said reference signal;

dividing said sector frequency control loop signal by a plurality of integer values, each integer value being inversely proportional to the product of said band constant multiplier and one of said plurality of band constants to produce a plurality of phase-synchronized sector timing signals.

2. A method of generating sector and data cell timing frequencies for a band variable frequency sector disc drive system which are derived from and synchronized to timing frequencies of information signals on servo tracks written on a dedicated surface of an associated disc, comprising the steps of:

selecting a plurality of different sector timing frequencies each corresponding to a different band on said disc, each of said plurality of different sector timing frequencies being proportional to the product of one of a plurality of integer band constants and a integer band constant multiplier;

generating a sector frequency control loop signal having a frequency which is an integral multiple of each of said plurality of sector timing frequencies;

receiving a reference signal from said servo tracks which has a frequency corresponding to the one of said sector timing frequencies having the one of said band constants with the largest prime number;

dividing said sector frequency control loop signal by an integer value to produce a sector frequency feedback signal having a frequency approximating said reference signal;

comparing the phase of said sector frequency feedback signal with said reference signal;

adjusting the frequency of said sector frequency control loop signal to synchronize the phase of said sector frequency control loop signal with said reference signal;

dividing said sector frequency control loop signal by a plurality of integer values, to produce a set of phase-synchronized sector timing signals, each integer value being inversely proportional to the product of said band constant multiplier and one of said band constants;

selecting a plurality of data cell timing frequencies, each of said data cell timing frequencies being proportional to the product of a band constant and a data cell band multiplier;

dividing said sector control loop signal by a data cell control loop input divisor comprising the product of the band constant with the largest prime number and a first integer to produce a data cell timing reference signal;

generating a data cell timing signal having a data cell timing frequency which is a selected one of said plurality of data cell timing frequencies;

dividing said data cell timing signal by the product of an integer data cell band constant and a second integer to produce a data cell timing feedback signal;

comparing the phase of said data cell timing feedback signal with said data cell timing reference signal; and adjusting the frequency of said data cell timing signal to synchronize the phase of said data cell timing feedback signal with said data cell timing reference signal and to synchronize the phase of said data cell timing signal with said reference signal.

3. A method of generating sector and data cell timing frequencies for a banded variable frequency sector disc drive system as set forth in claim 2, comprising the further steps of:

selecting a second plurality of second timing frequencies each corresponding to a different band on said disc, each of said second plurality of sector timing frequencies being proportional to the product of one of a plurality of integer band constants and an integer band constant multiplier;

generating a second sector frequency control loop signal having a frequency which is an integral multiple of each of said second plurality of sector timing frequencies;

dividing said second sector frequency control loop signal by an integer value to produce a second sector frequency feedback signal having a frequency approximating said second reference signal;

dividing said frequency feedback signal by an integer value to produce a second reference signal;

comparing the phase of said second sector frequency feedback signal with said second reference signal;

adjusting the frequency of said second sector frequency control loop signal to synchronize the phase of said second sector frequency control loop signal with said second reference signal; and dividing said second frequency control loop signal by a plurality of integer values, each integer value being inversely proportional to the product of said band constant multiplier and one of said plurality of band constants to produce a second plurality of phase-synchronized sector timing signals.

4. A circuit for generating different frequency sector timing for a banded variable frequency sector disc drive system which are derived from and synchronized to timing frequencies of information signals on servo tracks written on a dedicated surface of an associated disc, comprising:

means for generating a sector frequency control loop signal having a frequency which is an integral multiple of each of a plurality of sector timing frequencies each corresponding to a different band on said disc, each of said sector timing frequencies being proportional to the product of one of a plurality of integer band constants and an integer band constant multiplier;

means for dividing said sector frequency control loop signal by an integer value to produce a sector frequency feedback signal having a frequency corresponding to the one of said sector timing frequencies having the one of said band constants with the largest prime number;

means for receiving a reference signal from said servo tracks and for comparing the phase of said sector frequency feedback signal with said reference signal;

means for adjusting the frequency of said sector frequency control loop signal to synchronize the phase of said sector frequency control loop signal with said reference signal;

means for dividing said sector frequency control loop signal by a plurality of integer values, each integer value being inversely proportional to the product of said band constant multiplier and one of said plurality of band constants to produce a plurality of phase-synchronized sector timing signals.

5. A circuit for generating sector and data cell timing frequencies for a band variable frequency sector disc drive system which are derived from and synchronized to timing frequencies of information signals on servo tracks written on a dedicated surface of an associated disc, comprising:

means for generating a sector frequency control loop signal having a frequency which is an integral multiple of each of a plurality of sector timing frequencies each corresponding to a different band on said disc, each of said sector timing frequencies being proportional to the product of one of a plurality of integer band constants and an integer band constant multiplier;

means for dividing said sector frequency control loop signal by an integer value to produce a sector frequency feedback signal having a frequency corresponding to the one of said sector timing frequencies having the one of said band constants with the largest prime number;

means for receiving a reference signal from said servo tracks and for comparing the phase of said sector frequency feedback signal with said reference signal;

means for adjusting the frequency of said sector frequency control loop signal to synchronize the phase of said sector frequency control loop signal with said reference signal;

means for dividing said sector frequency control loop signal by a plurality of integer values, each integer value being inversely proportional to the product of said band constant multiplier and one of said plurality of band constants to produce a plurality of phase-synchronized sector timing signals;

means for dividing said sector control loop signal by a data cell control loop input divisor comprising the product of said band constant of said plurality of sector timing frequencies with said largest prime number and a first integer;

means for generating a data cell timing signal having a data cell timing frequency which is a selected one of a plurality of data cell timing frequencies, each of said data cell timing frequencies proportional to the product of a band constant and a data cell band multiplier;

means for dividing said data cell timing signal by the product of a integer data cell band constant and a second integer to produce a data cell timing feedback signal;

means for comparing the phase of said data cell timing feedback signal with said data cell timing reference signal; and means for adjusting the frequency of said data cell timing signal to synchronize the phase of said data cell timing feedback signal with said data cell timing reference signal.

6. A circuit for generating sector and data cell timing frequencies for a banded variable frequency sector disc drive system as set forth in claim 5, further comprising:

means for generating a second sector frequency control loop signal having a frequency which is an integral multiple of each of a second plurality of sector timing frequencies each corresponding to a different band on said disc, each of said second sector timing frequencies being proportional to the product of one of a plurality of integer band constants and an integer band constant multiplier;

means for dividing said second sector frequency control loop signal by an integer value to produce a second sector frequency feedback signal having a frequency corresponding to the one of said second sector timing frequencies having the one of said band constants with the largest prime number value;

means for dividing said frequency feedback signal by an integer value to produce a second reference signal;

means for comparing the phase of said second sector frequency feedback signal with said second reference signal;

means for adjusting the frequency of said second sector frequency control loop signal to synchronize the phase of said second sector frequency control loop signal with said second reference signal;

means for dividing said second sector frequency control loop signal by a plurality of integer values, each integer value being inversely proportional to the product of said band constant multiplier and one of said plurality of band constants to produce a second plurality of phase-synchronized sector timing signals.

* * * * *